J. CAIRNS.
TIRE OF WHEELS OF VEHICLES OR THE LIKE.
APPLICATION FILED APR. 14, 1911.
1,063,117.  Patented May 27, 1913.
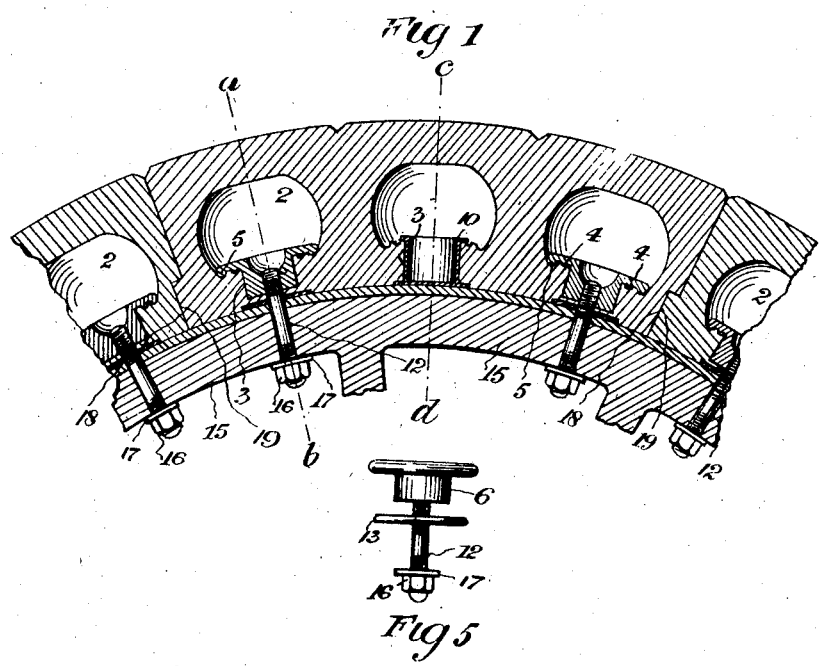
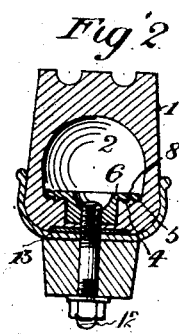
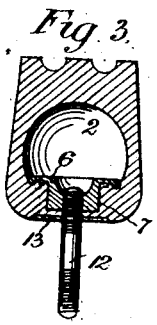
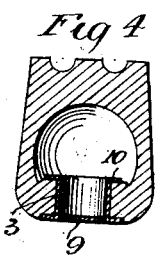
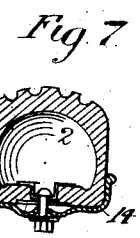
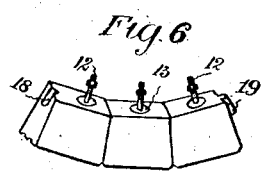
Witnesses:
Inventor
John Cairns,
By B. Singh
Attorney

UNITED STATES PATENT OFFICE.

JOHN CAIRNS, OF WALSALL, ENGLAND.

TIRE OF WHEELS OF VEHICLES OR THE LIKE.

1,063,117.

Specification of Letters Patent. Patented May 27, 1913.

Application filed April 14, 1911. Serial No. 621,101.

*To all whom it may concern:*

Be it known that I, JOHN CAIRNS, of 56 Wolverhampton road, Walsall, South Staffs, England, engineer, have invented certain new and useful Improvements in and Relating to the Tires of Wheels of Vehicles or the Like, of which the following is a specification.

The object of my invention has been to provide an improved resilient tire for vehicles which shall have, among others, any or all of the following advantages: That while it shall normally have pneumatic action, it shall be capable of valuable service, even though it be punctured; that it shall be capable of being made in sections so that an injured section can be replaced without requiring the replacement of the whole tire, that while it has a pneumatic action such action shall be obtainable with the use of air at atmosphereic pressure, so that pumping or other compression of the air is unnecessary, that the sections of the tire shall have sufficient resiliency to bear the weight of the load for a limited time without the pneumatic action; and that the air chambers in the tire shall be closed independently of any contact with the rim or other part of the wheel; and to such ends my invention consists in the resilient tire hereinafter specified.

In the accompanying drawings I have illustrated the invention by the form best known to me, but such form is to be regarded as typical of many possible forms, and my invention is not to be confined thereto.

In the accompanying drawings—Figure 1 is a longitudinal sectional elevation of the illustrated embodiment of my invention;
Fig. 2 is a cross-section on the line *a—b* of Fig. 1; Fig. 3 is a cross-section of the stud similar to that shown in Fig. 2, but disconnected from the wheel; Fig. 4 is a section on the line *c—d* of Fig. 1; Fig. 5 is an elevation of the fastening device of Figs. 2 and 3; Fig. 6 is a perspective view of a series of single sections of the tire disconnected from the rim; and Fig. 7 is a cross-sectional elevation of a stud or tire section in which the fastening to the rim is by means of a bolt riveted to the fastening plate, this construction being more specially adapted for light vehicle wheels.

In the construction illustrated in Figs. 1 to 5, I have provided a section 1, which is shown as rectangular in horizontal section but may be of any other figure in section, and which is resilient and preferably made of rubber. The section is provided with a chamber 2 and means are provided for closing this chamber independently of the rim, or any portion of the wheel, and such means are also preferably used for the purpose of fastening the section to the wheel. The chamber preferably has an opening in the bottom (or side next the wheel) and such opening is preferably smaller than the bottom, and the bottom is preferably substantially flat, and preferably provided with grooves 4 and 5. A fastening plate is preferably situated within the chamber and is preferably forced up through the opening in the bottom of the chamber. The fastening plate preferably has a mushroom or other suitably shaped head 6, and a reduced neck 7, which is adapted to fit the opening. The head of the plate has beads or rims 8 which are adapted to fit the grooves 4 and 5 in the bottom of the chamber. A bolt 12 is threaded into the head and it carries a cover plate 13 with which it also has threaded engagement, and by turning the cover plate on the bolt 12, the upper and lower surfaces of the bottom wall of the chamber are clamped between the mushroom head and the cover plate so as to make a substantially air-tight connection. The ribs and grooves aid in making the connection tighter. They also assist the grip of the fastening on the rubber stud to resist lateral strains. The bolt 12 is passed through the rim of the wheel and its lower end engaged by a nut 16 which fastens the entire section to the wheel. A washer 17 is preferably interposed between the nut 16 and the felly 15. The rim of the wheel, as shown in Fig. 2, is preferably flanged so as to engage the outer sides of the studs and supported against lateral strains.

While the tire sections may be made with a single chamber in each section, in the present instance I have shown a section to contain three chambers and I find it unnecessary to fasten the section at each chamber to the rim. I, therefore, provide the construction shown in Fig. 4 for closing the opening into the chambers not requiring the fastening. Such means, in the present instance, consists of a plug in the form of a shell 9 whose upper end is flanged over the upper surface of the bottom wall of the chamber, and whose lower end is closed by a bottom 11 which extends over the lower surface of said bottom wall.

The adjoining sections are preferably provided with recesses 18 into which projections 19 are dove-tailed.

In the form shown in Fig. 7, the bolt 12 is riveted at its upper beaded end to the fastening plate 6 within the chamber, instead of being screwed thereto.

I claim—

1. The combination of a resilient tire section having an air chamber therein and an opening through the base thereof, and having inclosing walls of sufficient strength to sustain a useful load independently of the air, sealing means for completely sealing said air chamber, a portion of said sealing means being within the interior of said section and said sealing means accomplishing its sealing function independently of the rim, and a device directly secured to said sealing means and adapted to fasten the tire to the wheel.

2. The combination of a resilient tire section having an air chamber therein and an opening through the base thereof, and having inclosing walls of sufficient strength to sustain a useful load independently of the air, sealing means for completely sealing said air chamber, a portion of said sealing means being within the interior of said section and being larger than said opening, and said sealing means accomplishing its sealing function independently of the rim, and a device directly secured to said sealing means and adapted to fasten the tire to the wheel.

3. The combination of a resilient tire section having an air chamber therein and an opening through the base thereof, and having inclosing walls of sufficient strength to sustain a useful load independently of the air, means entering said opening and larger than the same for sealing said chamber, means exterior to said opening and larger than the same, and a device clamping said two first mentioned means on the tire and adapted to secure them to the wheel to secure the tire to the wheel.

4. The combination of a resilient tire section having an air chamber therein and having inclosing walls of sufficient strength to sustain a useful load independently of air pressure, the bottom of said chamber having an opening therein, parts independent of the wheel and adapted respectively to clamp upper and lower surfaces of said bottom to close and seal the air chamber, and means for clamping said parts together, said means being adapted for fastening them to said wheel.

5. In a device of the character described, the combination of a hollow stud having inclosing walls with sufficient strength to sustain a load irrespective of the air in the stud, the bottom of the stud having an opening and a combined cover and fastening means trapping the air in the stud and clamping the base of the same upon the upper and lower surfaces around the hole in the base of the tire.

6. In a device of the character described, the combination of a hollow stud having inclosing walls with sufficient strength to sustain a load irrespective of the air in the stud, the bottom of the stud having an opening and a combined cover and fastening means trapping the air in the stud and clamping the base of the same upon the upper and lower surfaces around the hole in the base of the tire, said fastening means comprising a bolt carrying clamping plates.

7. In a device of the character described, the combination of a plurality of interlocking hollow tire studs, each having inclosing walls with sufficient strength to sustain a load irrespective of the air in the stud, the bottom of the stud having an opening and a combined cover and fastening means trapping the air in the stud and clamping the base of the same upon the upper and lower surfaces around the hole in the base of the tire.

8. In a device of the character described, the combination of a plurality of interlocking hollow tire studs, each having inclosing walls with sufficient strength to sustain a load irrespective of the air in the stud, the bottom of the stud having an opening and a combined cover and fastening means trapping the air in the stud and clamping the base of the same upon the upper and lower surfaces around the hole in the base of the tire, said fastening means comprising a bolt carrying clamping plates.

9. In a device of the character described, a tire having a plurality of hollow chambers with inclosing walls having sufficient strength to sustain a load irrespective of the air in the tire, the bottom of the tire having a hole and a closure for said hole, trapping the air in the tire by clamping the base of the tire upon the upper and lower surfaces around the hole in the base of the tire.

In testimony whereof I affix my signature in presence of two witnesses.

JOHN CAIRNS.

Witness:
 JOHN LIDDLE,
 JOHN TRAIN LIDDLE.